United States Patent
Das et al.

(10) Patent No.: US 7,706,367 B2
(45) Date of Patent: Apr. 27, 2010

(54) INTEGRATED TUNNELING AND NETWORK ADDRESS TRANSLATION: PERFORMANCE IMPROVEMENT FOR AN INTERCEPTION PROXY SERVER

(75) Inventors: Ranadip Das, Austin, TX (US); Amit Ranjan Lakra, Jharkhand (IN); Srikanth Subramanian, Chennai (IN); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 11/538,105

(22) Filed: Oct. 3, 2006

(65) Prior Publication Data
US 2008/0080508 A1  Apr. 3, 2008

(51) Int. Cl.
*H04L 12/28* (2006.01)
*H04L 12/56* (2006.01)

(52) U.S. Cl. ........................ 370/389; 370/392
(58) Field of Classification Search ............ None
See application file for complete search history.

(56) References Cited

U.S. PATENT DOCUMENTS

| | | | | |
|---|---|---|---|---|
| 5,915,119 A | * | 6/1999 | Cone | 713/310 |
| 6,779,051 B1 | * | 8/2004 | Basil et al. | 710/33 |
| 6,832,252 B1 | * | 12/2004 | Cieslak et al. | 709/225 |
| 6,886,103 B1 | * | 4/2005 | Brustoloni et al. | 726/15 |
| 2006/0050719 A1 | * | 3/2006 | Barr et al. | 370/401 |
| 2006/0146813 A1 | * | 7/2006 | Biswas et al. | 370/389 |

* cited by examiner

*Primary Examiner*—Chirag G Shah
*Assistant Examiner*—Ashley L Shivers
(74) *Attorney, Agent, or Firm*—Yee & Associates, P.C.; Matthew W. Baca

(57) ABSTRACT

A method for processing data packets in an interception proxy server without using a Network Address Translation module. A TCP packet received at a router is encapsulated using generic routing encapsulation (GRE). The TCP packet is redirected to a proxy server through a GRE tunnel which includes a redirection rule comprising a local destination IP address and port to be used for traffic passed through the tunnel. When the proxy server receives the TCP packet, the TCP packet is decapsulated. If a flag is set in the payload header of the TCP packet indicating that a redirection rule has been configured for traffic passed through the tunnel, the payload header of the TCP packet is modified according to the redirection rule. The modified TCP packet is then passed to a transmission control protocol of the proxy server.

18 Claims, 6 Drawing Sheets

INTEGRATED TUNNELING AND NETWORK ADDRESS TRANSLATION: PERFORMANCE IMPROVEMENT FOR AN INTERCEPTION PROXY SERVER

BACKGROUND OF THE INVENTION

1. Field of the Invention

The present invention relates generally to an improved data processing system, and in particular, to a computer implemented method, data processing system, and computer program product for processing data packets in an interception proxy server without using a network address translation module.

2. Description of the Related Art

Proxy servers are generally known in the art and are available for common Internet services. A proxy server is a server or an application that breaks the connection between a client and a server and performs some operations on behalf of the original server. For example, an HTTP proxy is used for Web access, and an SMTP proxy is used for e-mail. As an example, a proxy server may perform the operation of network address translation (NAT), which presents one organization-wide IP address to the Internet. The network address translation funnels all user requests to the Internet and fans responses back out to the appropriate users. Proxies may also cache Web pages, so that the next request can be obtained locally.

Figure 1:
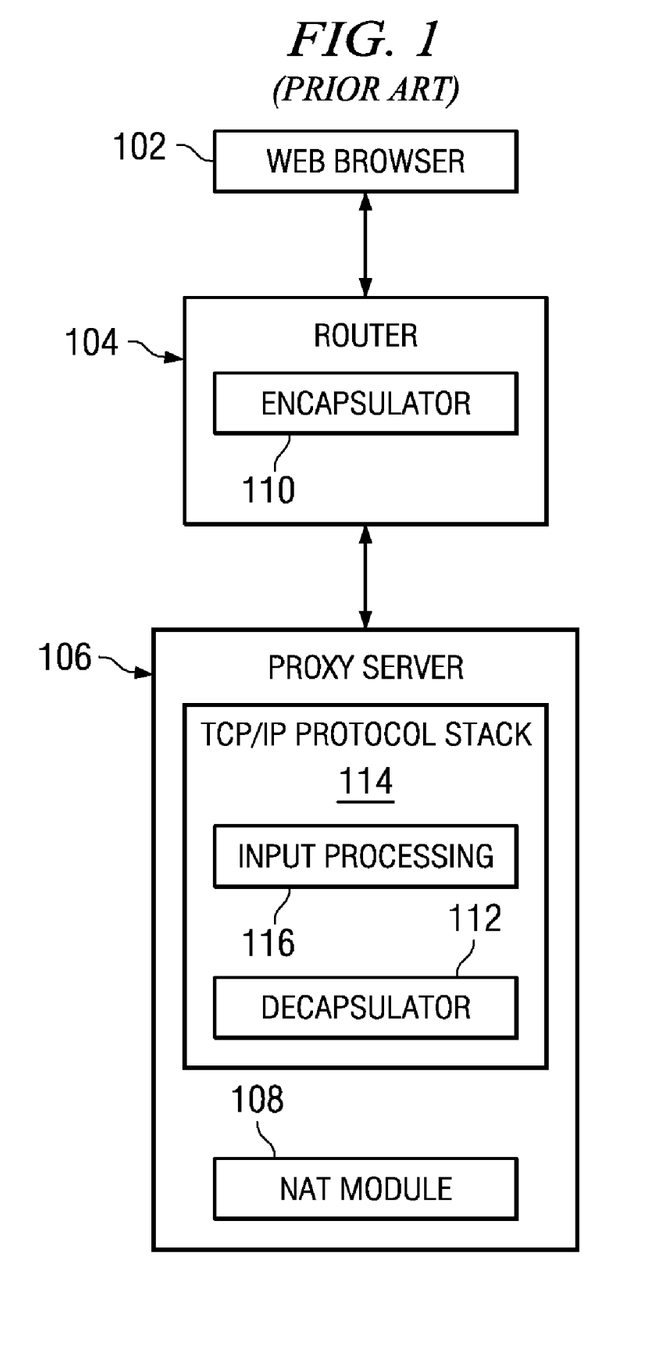
FIG. 1 depicts a known configuration of an interception proxy server system.

A configuration of a conventional interception proxy server system which provides network address translations is shown in FIG. 1. With the interception proxy server system, a user's Transmission Control Protocol (TCP) request via Web browser 102 may be diverted by router 104 to proxy server 106 using a combination of Generic Routing Encapsulation (GRE) and Internet Protocol (IP) Network Address Translation (NAT). Generic Routing Encapsulation is a method for encapsulating and routing a payload packet. The payload packet is first encapsulated in a GRE packet. The resulting GRE packet is then encapsulated in some other delivery protocol and forwarded to its destination. Network Address Translation comprises the translation of an IP address used within one network to a different Internet Protocol address known within another network. For instance, a company may map the local IP address on an outgoing data packet to a global IP address outside of the company's local network, and unmap the global IP address on incoming data packets back into a local IP address. Proxy server 106 configures a network address translation module 108 within the proxy to redirect all TCP traffic for a particular port, such as port "80", to the proxy.

Consider the example of a Web request which comprises a TCP packet containing a global destination address, "Google", and a global port number, "80". When the Web request "Google:80" passes router 104 and router 104 is aware of proxy server 106, router 104 encapsulates the TCP packet using generic routing encapsulator 110 and redirects the TCP packet from its intended destination address "Google:80" to proxy server 106. When the encapsulated packet arrives at proxy server 106, decapsulator 112 decapsulates the GRE packet. Decapsulation is typically performed in TCP/IP protocol stack 114. Proxy server 106 then applies NAT module 108 to convert the global destination address and port, "Google:80" to a local destination address and port number for proxy server 106. For instance, the address may be translated to "local_ipname:5000". This network address translation is commonly implemented using firewall software products such as IPFilter which provide D-NAT (destination network address translation) and S-NAT (source network address translation) functionality as well as firewall services. Incoming packets to proxy server 106 are subject to a D-NAT rule, and the outgoing packets are subject to an S-NAT rule.

Although NAT module 108 allows proxy server 106 to convert an IP address from one network to another, if proxy server 106 is very busy, proxy server 106 can experience a large amount of state maintenance overhead by requiring a large number of entries to be created and maintained. Specifically, proxy server 106 must perform a number of steps to an incoming GRE packet before the packet may be delivered to the destination server. Input processing 116 in TCP/IP protocol stack 112 receives the GRE packet and passes the packet to the firewall product (NAT module 108), since all incoming IP packets are scanned by the firewall. NAT module 108 will return the packet back to input processing 116 without any modifications. Input processing 116 will then pass the packet to the GRE protocol processor (decapsulator 112) for decapsulation.

If the decapsulation is successful, the GRE headers are stripped off and the "payload" packet is passed back to input processing 116 again for processing of the "payload" packet. Input processor 116 validates the IP packet and passes it to the firewall. The firewall applies D-NAT to convert destination IP address of "Google" to a local IP address, and destination port of 80 to the local port on which the interception proxy server is listening. If a network address translation entry does not exist, the process creates one. If a network address translation entry exists, the process performs state maintenance and updates the TCP checksum. The modified packet is then passed to input processing 116 to continue processing of the packet. Input processing 116 then determines that the destination IP address is one of the local interfaces, and input processing 116 passes the packet to TCP.

There are, however, several drawbacks to using the interception proxy technique described above. One limitation is that NAT module 108 maintains an entry for each TCP connection. On a busy interception proxy server server, the number of these connections can grow to a very large number. NAT module 108 maintains state to decide when to expire these entries. In addition, current interception proxy techniques cause all incoming packets to be passed to the firewall twice. And, for outgoing TCP packets, input processing 116 passes the TCP packet to the firewall to perform source network address translation.

SUMMARY OF THE INVENTION

The illustrative embodiments provide a computer implemented method, data processing system, and computer program product for processing data packets in an interception proxy server without using a network address translation module. When a TCP packet is received at a router, the TCP packet is encapsulated using generic routing encapsulation. The TCP packet is then redirected to an interception proxy server through a generic routing encapsulation tunnel, wherein the generic routing encapsulation tunnel includes a redirection rule comprising a local destination Internet Protocol address and port to be used for traffic passed through the particular generic routing encapsulation tunnel. When the interception proxy server receives the TCP packet, the TCP packet is decapsulated. If a flag is set in the payload header of the TCP packet indicating that a redirection rule has been configured for traffic passed through the generic routing encapsulation tunnel, the payload header of the TCP packet is modified according to the redirection rule. The modified TCP packet is then passed to a transmission control protocol of the interception proxy server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
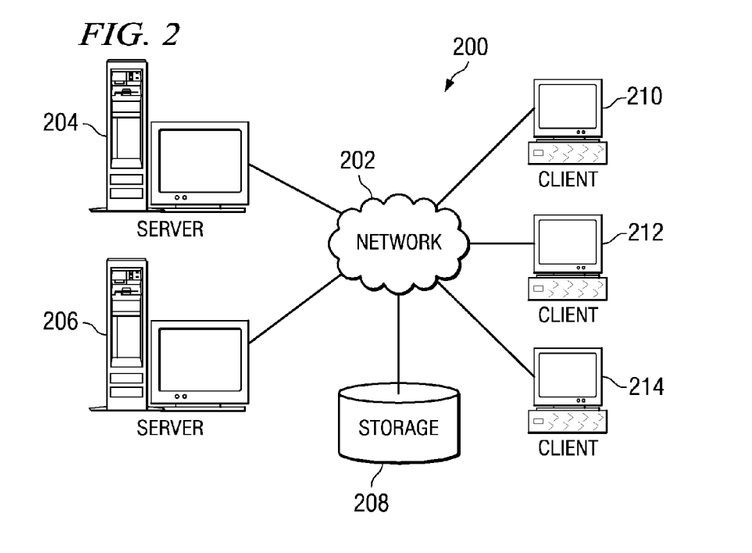
FIG. 2 depicts a pictorial representation of a distributed data processing system in which the illustrative embodiments may be implemented.
Figure 3:
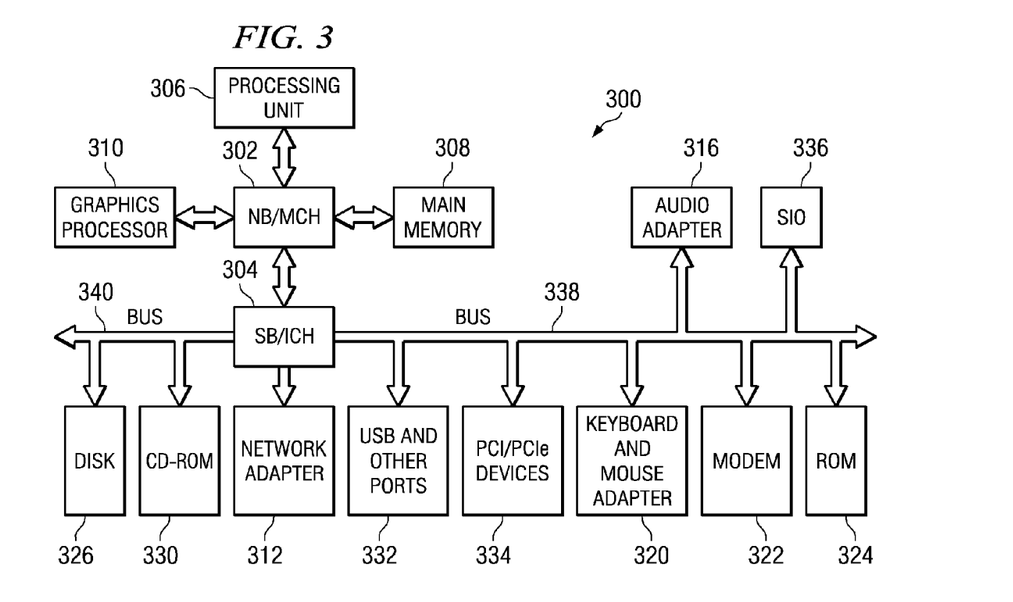
FIG. 3 is a block diagram of a data processing system in which the illustrative embodiments may be implemented.

With reference now to the figures and in particular with reference to FIGS. 2-3, exemplary diagrams of data processing environments are provided in which illustrative embodiments may be implemented. It should be appreciated that FIGS. 2-3 are only exemplary and are not intended to assert or imply any limitation with regard to the environments in which different embodiments may be implemented. Many modifications to the depicted environments may be made.

With reference now to the figures, FIG. 2 depicts a pictorial representation of a network of data processing systems in which illustrative embodiments may be implemented. Network data processing system 200 is a network of computers in which embodiments may be implemented. Network data processing system 200 contains network 202, which is the medium used to provide communications links between various devices and computers connected together within network data processing system 200. Network 202 may include connections, such as wire, wireless communication links, or fiber optic cables.

In the depicted example, server 204 and server 206 connect to network 202 along with storage unit 208. In addition, clients 210, 212, and 214 connect to network 202. These clients 210, 212, and 214 may be, for example, personal computers or network computers. In the depicted example, server 204 provides data, such as boot files, operating system images, and applications to clients 210, 212, and 214. Servers 204 and 206 may also be proxy servers. Clients 210, 212, and 214 are clients to server 204 in this example. Network data processing system 200 may include additional servers, clients, and other devices not shown.

In the depicted example, network data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 200 also may be implemented as a number of different types of networks, such as for example, an intranet, a local area network (LAN), or a wide area network (WAN). FIG. 2 is intended as an example, and not as an architectural limitation for different embodiments.

With reference now to FIG. 3, a block diagram of a data processing system is shown in which illustrative embodiments may be implemented. Data processing system 300 is an example of a computer, such as server 204 or client 210 in FIG. 2, in which computer usable code or instructions implementing the processes may be located for the illustrative embodiments.

In the depicted example, data processing system 300 employs a hub architecture including a north bridge and memory controller hub (MCH) 302 and a south bridge and input/output (I/O) controller hub (ICH) 304. Processor 306, main memory 308, and graphics processor 310 are coupled to north bridge and memory controller hub 302. Graphics processor 310 may be coupled to the MCH through an accelerated graphics port (AGP), for example.

In the depicted example, local area network (LAN) adapter 312 is coupled to south bridge and I/O controller hub 304 and audio adapter 316, keyboard and mouse adapter 320, modem 322, read only memory (ROM) 324, universal serial bus (USB) ports and other communications ports 332, and PCI/PCIe devices 334 are coupled to south bridge and I/O controller hub 304 through bus 338, and hard disk drive (HDD) 326 and CD-ROM drive 330 are coupled to south bridge and I/O controller hub 304 through bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be coupled to south bridge and I/O controller hub 304.

An operating system runs on processor 306 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 300. Java and all Java-based trademarks are trademarks of Sun Microsystems, Inc. in the United States, other countries, or both.

Instructions for the operating system, the object-oriented programming system, and applications or programs are located on storage devices, such as hard disk drive 326, and may be loaded into main memory 308 for execution by processor 306. The processes of the illustrative embodiments may be performed by processor 306 using computer implemented instructions, which may be located in a memory such as, for example, main memory 308, read only memory 324, or in one or more peripheral devices.

The hardware in FIGS. 2-3 may vary depending on the implementation. Other internal hardware or peripheral devices, such as flash memory, equivalent non-volatile memory, or optical disk drives and the like, may be used in addition to or in place of the hardware depicted in FIGS. 2-3. Also, the processes of the illustrative embodiments may be applied to a multiprocessor data processing system.

In some illustrative examples, data processing system 300 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 308 or a cache such as found in north bridge and memory controller hub 302. A processing unit may include one or more processors or CPUs. The depicted examples in FIGS. 2-3 and above-described examples are not meant to imply architectural limitations. For example, data processing system 300 also may be a tablet computer, laptop computer, or telephone device in addition to taking the form of a PDA.

The illustrative embodiments provide an improved interception proxy server process which eliminates the need for a separate firewall product to perform the D-NAT and S-NAT functions. In other words, for the interception proxy server scenario described in FIG. 1 above, the illustrative embodiments provide for removing the need for a separate NAT module to provide the address translations, such as IPFilter. Removing the NAT module allows for eliminating all of the state maintenance overhead, such as the creation and maintenance of large number of address entries performed by the NAT module.

As previously mentioned, an incoming packet with a destination IP address, such as Google's IP address, and a destination port, such as Web server port 80, is translated by a NAT module to a local IP address and local port. For an outgoing packet, the NAT module translates the local IP address and local port back to Google's IP address and Google's Web server port. Thus, the information that the NAT module provides in existing proxy servers is the original IP destination address and the original TCP destination port to which the packets were originally heading. This destination information is not available to the TCP/IP protocol stack otherwise. With the illustrative embodiments, an administrator, when configuring a GRE tunnel in the router for redirecting all TCP traffic to a proxy server, will provide the destination IP address and port to which all HTTP traffic should be redirected. Thus, the local destination IP address and port information to which all packets are to be redirected is configured by the user. In this manner, a packet's destination IP address and port information is modified according to the user's configuration of the local destination IP address and port information for the proxy server. This IP address and port information is tied to the GRE tunnel information. With the user-defined configuration and a minor change in TCP packet processing in the TCP/IP protocol stack in the interception proxy server, the need for the NAT module is eliminated.

Figure 4:
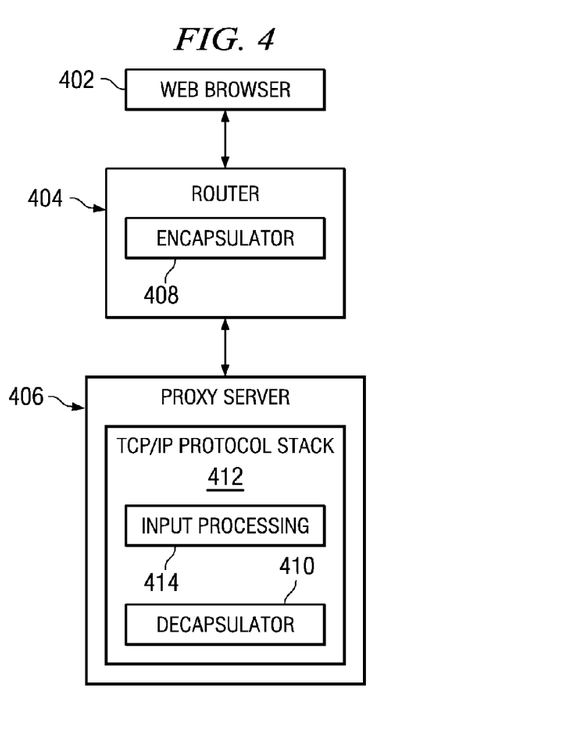
FIG. 4 is a block diagram of a configuration of an interception proxy server in accordance with the illustrative embodiments.

Turning now to FIG. 4, a block diagram of a configuration of an interception proxy server system in accordance with the illustrative embodiments is shown. The interception proxy server system comprises Web browser 402, router 404, and proxy server 406. Web browser 402 is an example of a client device, such as client 210 in FIG. 2. Proxy server 406 is an example of a server, such as server 204 in FIG. 2.

Using the earlier example of a Web request from Web browser 402 which comprises a TCP packet containing a global destination address, "Google", and a global port number, "80", router 404 encapsulates the incoming TCP packet using generic routing encapsulator 408 when the Web request "Google:80" passes router 404. Router 404 then redirects the encapsulated TCP packet from its intended destination address "Google:80" to interception proxy server 406.

When the encapsulated packet arrives at interception proxy server 406, decapsulator 410, which is implemented within TCP/IP protocol stack 412, decapsulates the GRE packet by first stripping the GRE header from the incoming packet. At this point, the method of processing a redirected TCP packet in the illustrative embodiments diverges from existing processes which employ a NAT module, which is described in FIG. 1.

In the illustrative embodiments, the decapsulation step includes performing a simple test to determine if a flag has been set in the GRE header for this particular GRE tunnel to indicate that the administrator has configured an HTTP redirection rule on TCP packets arriving on this tunnel. If an HTTP redirector has been configured for this GRE tunnel, decapsulator 410 modifies the destination IP address and destination TCP port in the payload IP header of the TCP packet with the information in the redirection rule configured by the administrator. For instance, the destination IP address and destination TCP port fields in the payload IP header of the TCP packet may be modified from the global IP address and port number (e.g., "Google:80") to now contain a local IP address and port number specified in the redirection rule (e.g., "local_ipname:5000"). Decapsulator 410 also updates the IP and TCP checksum fields in the payload area.

When modifying the address and port information for the packet, the illustrative embodiments use the space freed up by the stripped GRE header to store mapping information for the packet. This mapping information is prepended in front of the destination IP address and port in the payload IP header and comprises the original destination IP address and the original TCP port of the packet, such as "Google:80". The mapping information and modified payload header are then passed with the packet to input processing module 414. Input processing module 414 may then determine that the destination IP address is one of the local interfaces, and then pass the packet to TCP. The packet headers are described further in FIGS. 5A and 5B below.

By allowing an administrator to configure a GRE tunnel to redirect all HTTP traffic to a specific destination IP address and port eliminates the complexity involved when using a NAT module (as shown in FIG. 1) to perform the same redirection operation. For example, the NAT module must search a table, which may be very large on a busy web proxy, to see if an entry exists in the table for this four-tuple (i.e., destination IP address, destination port, source IP address, source port). The conventional NAT techniques are now replaced in the illustrative embodiments by identifying a flag in the GRE header of the encapsulated packet to determine if the administrator has configured a redirection rule on packets arriving on this GRE tunnel, followed by a protocol (TCP) and destination port number check. This check is a trivial check compared to the table lookup and all the other stateful operations that NAT is required to perform.

When an outgoing TCP packet from the proxy server is received at the local system (Web browser 402) via the GRE tunnel, the local system copies the prepended mapping information (original destination IP address and port) into a control block where all of the TCP states for the system are retained. It should be noted that TCP is required to perform this step only once during the life of the TCP connection, such as at connection set up time. On implementations such as BSD (and BSD-derived, such as AIX), a template may be created which consists of a skeletal IP & TCP packet to minimize the work required by TCP output processing for sending a packet on the TCP connection. The illustrative embodiments replace the source IP address and the source port in this template with the original destination IP address and port passed to TCP in the prepended mapping area of the incoming packet. With this once-per-connection operation, all outgoing TCP packets in the connection will automatically contain the original source IP address and TCP port (for instance, "Google:80" using previous example). Consequently, the NAT module for outgoing TCP packets may be eliminated.

Figure 5A:
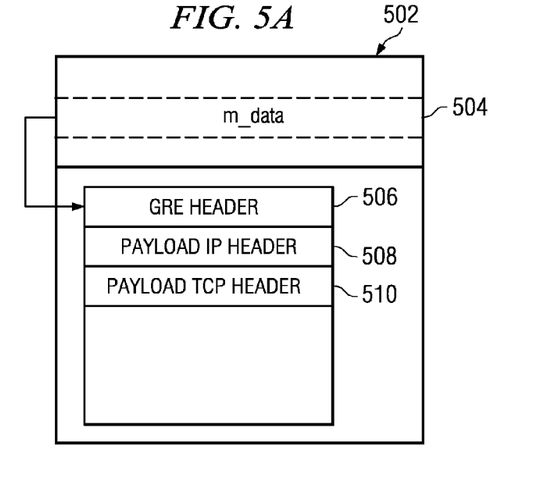
FIG. 5A is a diagram illustrating the content of a packet when the packet is received at the interception proxy server in accordance with the illustrative embodiments.

FIG. 5A is a diagram illustrating the content of a packet when the packet is received at the interception proxy server in accordance with the illustrative embodiments. When a packet is rerouted to the proxy server via a GRE tunnel, the packet, which is stored in a memory buffer (Mbuf) 502, initially comprises the payload (m_data) 504 packet which passed through the GRE tunnel is placed inside a GRE packet, and is given a GRE header, such as GRE header 506. When the GRE packet arrives at the final destination (the endpoint of the tunnel), the GRE packet is stripped off and the encapsulated packet is then transmitted to the TCP/IP protocol stack for processing. As shown, the packet stored in Mbuf-502 comprises m_data 504, GRE header 506, payload IP header 508, and payload TCP header 510. M_data 504 comprises the payload of the packet. GRE header 506 comprises flags (e.g., checksum, routing, etc.), protocol type information, and payload information for the packet. Payload IP header 508 comprises the source IP address and the destination IP address. Payload TCP header 510 follows payload IP header 508, and comprises information specific to the TCP protocol, such as the source port information and the destination port information. Payload TCP header 510 also includes the checksum information.

Figure 5B:
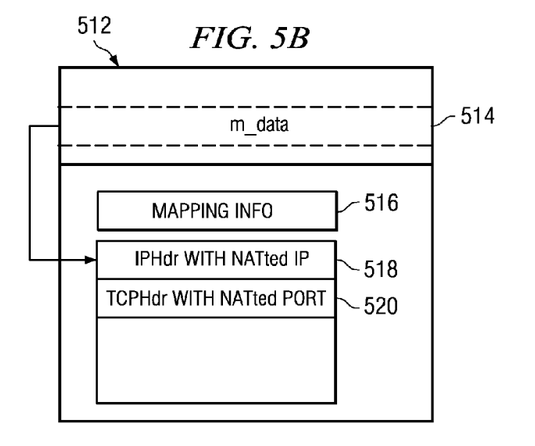
FIG. 5B is a diagram illustrating the content of the packet in FIG. 5A after the decapsulation process in the interception proxy server in accordance with the illustrative embodiments.

FIG. 5B is a diagram illustrating the content of the packet in FIG. 5A after the packet is decapsulated in the interception proxy server and the address and port information is modified in accordance with the illustrative embodiments. The packet may be in TCP/IP Protocol Stack 412 in FIG. 4. The packet stored in the memory buffer (Mbuf 512) comprises m_data 514, mapping information 516, IP header 518, and TCP header 520. M_data 504 comprises the payload of the packet. Mapping information 516 comprises the original destination IP address and the original destination port. Using the previous example, mapping information may comprise "Google: 80". IP header 518 comprises the source address information and the NATted or translated local IP address. TCP header 520 comprises the source port information and the NATted or translated local port information. Using the example above, the NATted IP address in IP header 518 may comprise "local_ipname", and the NATted port in TCP header 529 may comprise "5000".

Figure 6:
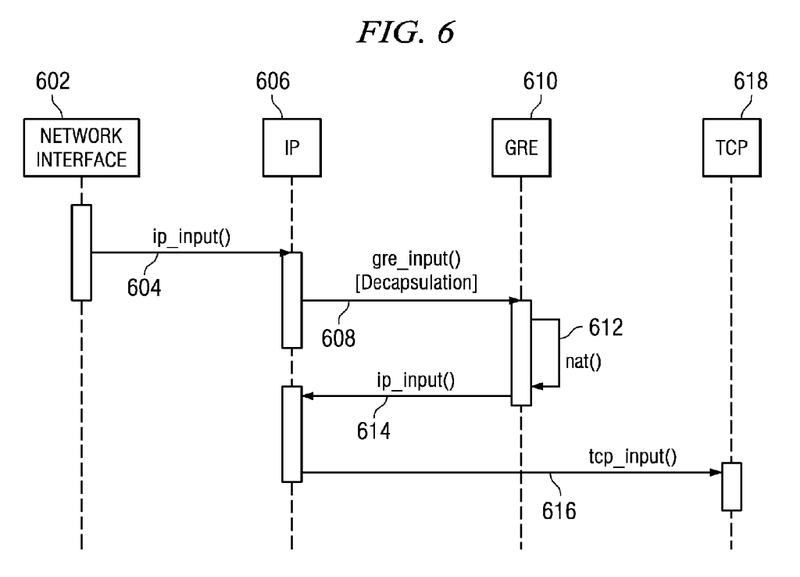
FIG. 6 is a diagram illustrating a sequence of operations in the TCP/IP protocol stack in accordance with the illustrative embodiments.

FIG. 6 is a diagram illustrating a sequence of operations performed in the TCP/IP protocol stack, such as TCP/IP protocol stack 412 in FIG. 4. When a TCP packet arrives at network interface 602, an ip_input( ) command 604 is called to process the IP header and pass the packet to input processing module 606. A checksum computation/verification is then performed to detect any corruption of the packet in the network. This checksum comprises checking the packet's destination IP address to determine if the address is the same as the GRE tunnel's local IP address. If the checksum is not successful (i.e., the packet's destination IP address is not any of the local IP addresses), input processing module 606 attempts to route the TCP packet to the proper destination. If the checksum is successful, a gre_input( ) 608 command is called to pass the TCP packet to GRE 610, wherein the decapsulation of the TCP packet is performed.

Within GRE 610, the decapsulator checks to see if a flag has been set in the GRE header to indicate an HTTP redirection rule has been configured on TCP packets arriving on this GRE tunnel. If so, the decapsulator calls a nato command 612, which modifies the destination IP address and destination TCP port in the payload IP header of the TCP packet by replacing it with the information specified in the user-defined redirection rule. For example, the user-defined redirection rule may specify that the destination IP address and port "Google:80" should be modified to "local_ipname:5000". Nato command 612 also updates the IP/TCP checksum fields in the payload area, such as prepended mapping information and modified payload header information.

GRE 610 then calls ip_input( ) command 614 which passes the modified TCP packet to input processing module 606. Input processing module 606 examines the modified packet header, and determines that the original header has been stripped. Input processing module 606 then calls tcp_input( ) command 616 to pass the packet to TCP 618.

Figure 7:
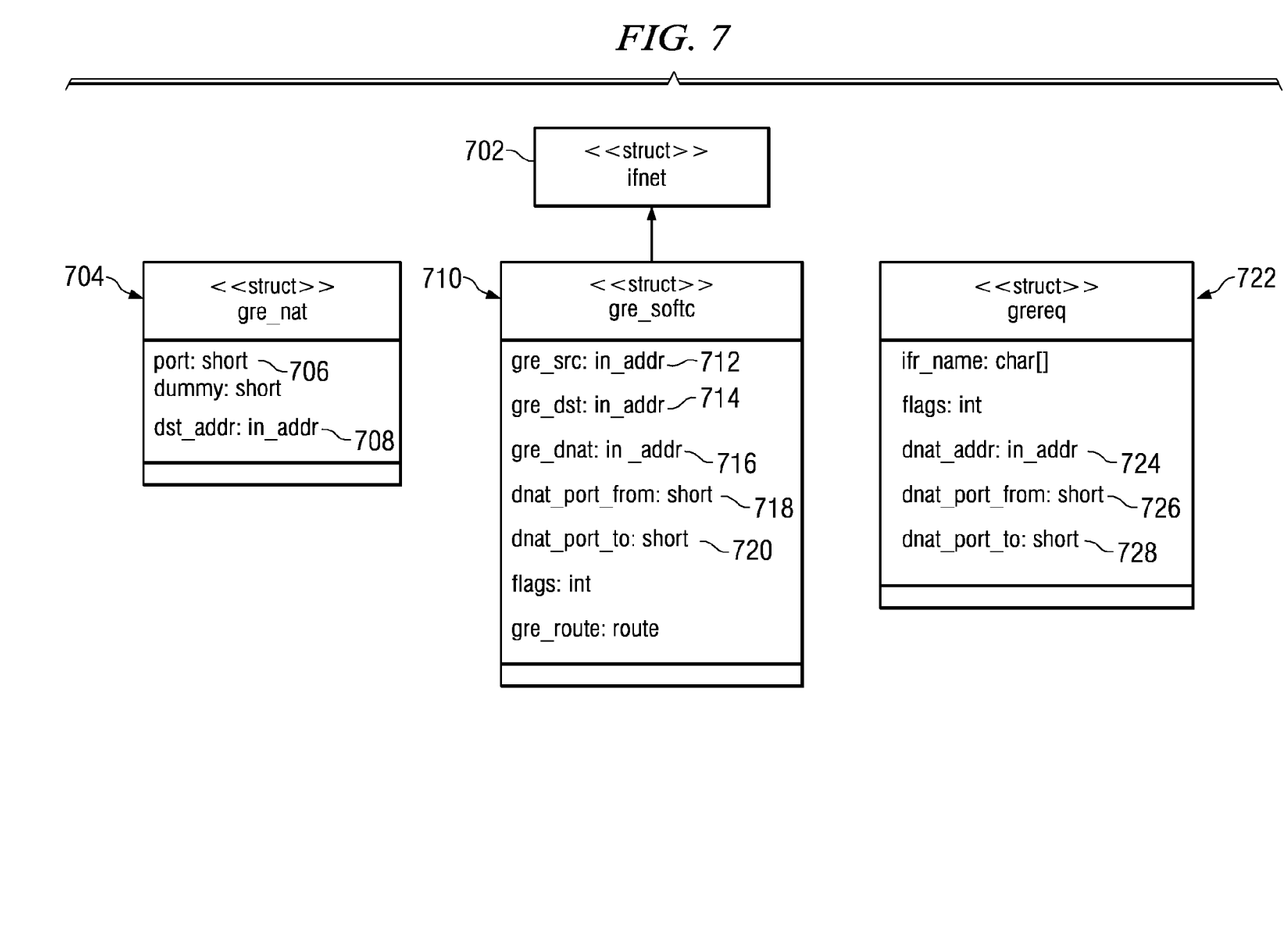
FIG. 7 is a diagram of data structures used for generic routing encapsulation and network address translation in accordance with the illustrative embodiments.

FIG. 7 is a diagram of data structures used for generic routing encapsulation and network address translation in accordance with the illustrative embodiments. Each device driver for a network interface initializes a specialized ifnet structure, such as ifnet structure 702, and inserts the structure into a linked list of interfaces. Ifnet structure 702 is a generic structure that stores all information related to any IP interface, such as a GRE interface. GRE_NAT structure 704 contains the port and IP address information that is passed to TCP for later network address translation of outgoing packets. In other words, GRE_NAT structure 704 provides the mapping information, such as mapping information 516 in FIG. 5 (i.e., original destination address and port information) which is prepended in Mbuf 512 after the decapsulation of the GRE packet is completed. GRE_NAT structure 704 includes port field 706 and dst_addr field 708. Using the previous example, port field 706 may comprise "80", and dst_addr field 708 may comprise the original destination address "Google".

GRE_softc structure 710 is an interface specific structure which retains, in addition to ifnet information, state information specific to the GRE interface, such as the source and destination tunnel IP address, and network address translation information that the user has configured. This information is inserted on the ifnet structure list. GRE_softc structure 710 includes gre_src field 712, gre_dst field 714, gre_dnat field 716, dnat_port_from field 718, dnat_port_to field 720. Information in gre_src field 712 and gre_dst field 714 is the same as in existing redirection techniques. However, gre_dnat field 716 comprises the user-defined local destination IP address, such as "local_ipname". Dnat_port_from field 718 comprises the original destination port (e.g., "80"), and dnat_port_to field 720 comprises the user-defined local destination port (e.g., "5000").

GREREQ structure 722 is used as input for the network address translation configuration on the generic routing encapsulation. GREREQ structure 722 may be used by the gre_ioctl( ) command. GREREQ structure 722 includes dnat_address field 724, dnat_port_from 726, and dnat_port_to 728. Dnat_address field 724 comprises any user-defined local interface address. Dnat_port_from 726 comprises the original destination port (e.g., "80"), and dnat_port_to field 728 comprises the user-defined local destination port (e.g., "5000").

Figure 8:
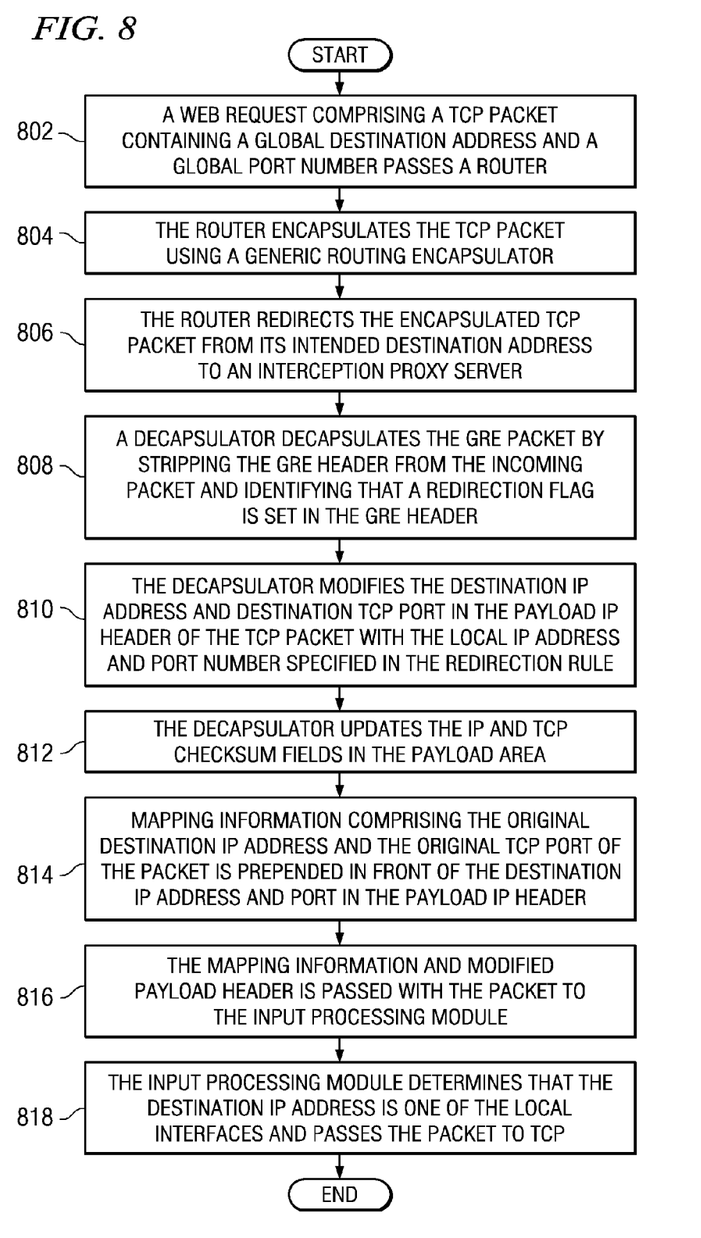
FIG. 8 is a flowchart of a process for processing data packets in an interception proxy server using integrated tunneling and network address translation in accordance with the illustrative embodiments.

FIG. 8 is a flowchart of a process for processing data packets in an interception proxy server using integrated tunneling and network address translation in accordance with the illustrative embodiments. The process begins when a Web request from a Web browser which comprises a TCP packet containing a global destination address and a global port number passes a router (step 802). The router encapsulates the TCP packet using a generic routing encapsulator (step 804), and redirects the encapsulated TCP packet from its intended destination address to an interception proxy server (step 806).

When the encapsulated packet arrives at the interception proxy server, a decapsulator implemented within the TCP/IP protocol stack decapsulates the GRE packet by stripping the GRE header from the incoming packet and identifying that a redirection flag is set in the GRE header, which indicates that an HTTP redirection rule has been configured for TCP packets arriving on the GRE tunnel used (step 808). Based on identifying the flag, the decapsulator then modifies the destination IP address and destination TCP port in the payload IP header of the TCP packet with the local IP address and port number specified in the redirection rule (step 810), and updates the IP and TCP checksum fields in the payload area (step 812). Mapping information comprising the original destination IP address and the original TCP port of the packet is also prepended in front of the destination IP address and port in the payload IP header (step 814). The mapping information and modified payload header are then passed with the packet to the input processing module (step 816). The input processing module may then determine that the destination IP address is one of the local interfaces, and pass the packet to TCP (step 818), with the process terminating thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing data packets in an interception proxy server, the computer implemented method comprising:

responsive to receiving a transmission control protocol packet at a router, encapsulating the transmission control protocol packet using generic routing encapsulation;

redirecting, by the router, the transmission control protocol packet to an interception proxy server through a generic routing encapsulation tunnel, wherein the generic routing encapsulation tunnel includes a redirection rule comprising a local destination Internet Protocol address and port to be used for traffic passed through the particular generic routing encapsulation tunnel;

responsive to receiving the transmission control protocol packet at the interception proxy server, decapsulating the transmission control protocol packet, wherein decapsulating includes identifying whether a flag indicating that a redirection rule has been configured for traffic passed through the generic routing encapsulation tunnel is set in a generic routing encapsulation header of the transmission control protocol packet;

responsive to identifying that the flag is set in the generic routing encapsulation header of the transmission control protocol packet, modifying the payload header of the transmission control protocol packet according to the redirection rule; and passing the modified transmission control protocol packet to a transmission control protocol of the interception proxy server.

2. The computer implemented method of claim 1, wherein the modifying step includes prepending mapping information above the payload header, wherein the mapping information comprises an original destination Internet Protocol address and port of the transmission control protocol packet.

3. The computer implemented method of claim 1, wherein the modifying step includes updating Internet Protocol and transmission control protocol checksums in the payload header.

4. The computer implemented method of claim 1, wherein the redirection rule is tied to the generic routing encapsulation tunnel.

5. The computer implemented method of claim 1, wherein the redirection rule is user-defined.

6. The computer implemented method of claim 2, further comprising:
responsive to a local system receiving a transmission control protocol packet from the generic routing encapsulation tunnel, copying the prepended mapping information comprising the original destination Internet Protocol address and port into a control block of transmission control protocol states for the local system.

7. A data processing system for processing data packets in an interception proxy server, the data processing system comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to, in response to receiving a transmission control protocol packet at a router, encapsulate the transmission control protocol packet using generic routing encapsulation, redirect the transmission control protocol packet to an interception proxy server through a generic routing encapsulation tunnel, wherein the generic routing encapsulation tunnel includes a redirection rule comprising a local destination Internet Protocol address and port to be used for traffic passed through the particular generic routing encapsulation tunnel, decapsulate the transmission control protocol packet in response to receiving the transmission control protocol packet at the interception proxy server, wherein decapsulating includes identifying whether a flag indicating that a redirection rule has been configured for traffic passed through the generic routing encapsulation tunnel is set in a generic routing encapsulation header of the transmission control protocol packet, modify a payload header of the transmission control protocol packet according to the redirection rule in response to identifying that the flag is set in the generic routing encapsulation header of the transmission control protocol, and pass the modified transmission control protocol packet to a transmission control protocol of the interception proxy server.

8. The data processing system of claim 7, wherein the computer usable code to modify the payload header includes prepending mapping information above the payload header, wherein the mapping information comprises an original destination Internet Protocol address and port of the transmission control protocol packet.

9. The data processing system of claim 7, wherein the computer usable code to modify the payload header includes updating Internet Protocol and transmission control protocol checksums in the payload header.

10. The data processing system of claim 7, wherein the redirection rule is tied to the generic routing encapsulation tunnel.

11. The data processing system of claim 7, wherein the redirection rule is user-defined.

12. The data processing system of claim 8, the processing unit further executes the computer usable code to copy, in response to a local system receiving a transmission control protocol packet from the generic routing encapsulation tunnel, the prepended mapping information comprising the original destination Internet Protocol address and port into a control block of transmission control protocol states for the local system.

13. A computer program product for processing data packets in an interception proxy server, the computer program product comprising:
a computer usable storage medium having computer usable program code stored thereon, the computer usable program code comprising:
computer usable program code for encapsulating a transmission control protocol packet using generic routing encapsulation in response to receiving the transmission control protocol packet at a router;
computer usable program code for redirecting the transmission control protocol packet to an interception proxy server through a generic routing encapsulation tunnel, wherein the generic routing encapsulation tunnel includes a redirection rule comprising a local destination Internet Protocol address and port to be used for traffic passed through the particular generic routing encapsulation tunnel;
computer usable program code for decapsulating the transmission control protocol packet in response to receiving the transmission control protocol packet at the interception proxy server, wherein decapsulating includes identifying whether a flag indicating that a redirection rule has been configured for traffic passed through the generic routing encapsulation tunnel is set in a generic routing encapsulation header of the transmission control protocol packet;
computer usable program code for modifying, in response to identifying that the flag is set in a generic routing encapsulation header of the transmission control protocol packet, the payload header of the transmission control protocol packet according to the redirection rule; and
computer usable program code for passing the modified transmission control protocol packet to a transmission control protocol of the interception proxy server.

14. The computer program product of claim 13, wherein the computer usable program code for modifying the payload header includes prepending mapping information above the payload header, wherein the mapping information comprises an original destination Internet Protocol address and port of the transmission control protocol packet.

15. The computer program product of claim 13, wherein the computer usable program code for modifying the payload header includes updating Internet Protocol and transmission control protocol checksums in the payload header.

16. The computer program product of claim 13, wherein the redirection rule is tied to the generic routing encapsulation tunnel.

17. The computer program product of claim 13, wherein the redirection rule is user-defined.

18. The computer program product of claim 14, further comprising:
computer usable program code for copying, in response to a local system receiving a transmission control protocol packet from the generic routing encapsulation tunnel, the prepended mapping information comprising the original destination Internet Protocol address and port into a control block of transmission control protocol states for the local system.

* * * * *